(12) United States Patent
Nybo

(10) Patent No.: US 8,777,137 B2
(45) Date of Patent: Jul. 15, 2014

(54) GRINDER UNIT AND METHOD FOR CONTROLLING IT

(75) Inventor: Peter Jungklas Nybo, Randers SV (DK)

(73) Assignee: Grundfos Management a/s, Bjerringbro (DK)

(*) Notice: Subject to any disclaimer, the term of this patent is extended or adjusted under 35 U.S.C. 154(b) by 403 days.

(21) Appl. No.: 13/212,575

(22) Filed: Aug. 18, 2011

(65) Prior Publication Data

US 2012/0056025 A1    Mar. 8, 2012

(30) Foreign Application Priority Data

Sep. 2, 2010  (EP) .................................. 10009102

(51) Int. Cl.
*B02C 19/00*  (2006.01)

(52) U.S. Cl.
USPC .............................................. 241/30; 241/36

(58) Field of Classification Search
USPC ................................................... 241/30, 36
See application file for complete search history.

(56) References Cited

U.S. PATENT DOCUMENTS

| 5,511,729 A | 4/1996 | Husain |
| 6,561,444 B1* | 5/2003 | Yokomine et al. ............... 241/30 |
| 2002/0104907 A1 | 8/2002 | Strutz et al. |
| 2010/0308143 A1* | 12/2010 | Mancuso ........................ 241/60 |

FOREIGN PATENT DOCUMENTS

| JP | 10-043617 A | 2/1998 |
| WO | 2008138069 A1 | 11/2008 |

OTHER PUBLICATIONS

Extended EP Search Report issued Jan. 24, 2011 in EP Application No. 10009102.4.

* cited by examiner

*Primary Examiner* — Faye Francis
(74) *Attorney, Agent, or Firm* — Panitch Schwarze Belisario & Nadel LLP

(57) ABSTRACT

A grinder unit (2) includes an electrical grinder motor (20), a current sensing device for measuring the current (32) used by the grinder motor (20), and a control device (16) for controlling the activity of the grinder motor (20). The control device (16) is configured to change the activity of the grinder motor (20) on the basis of the measured current (32) of the grinder motor (20).

11 Claims, 4 Drawing Sheets

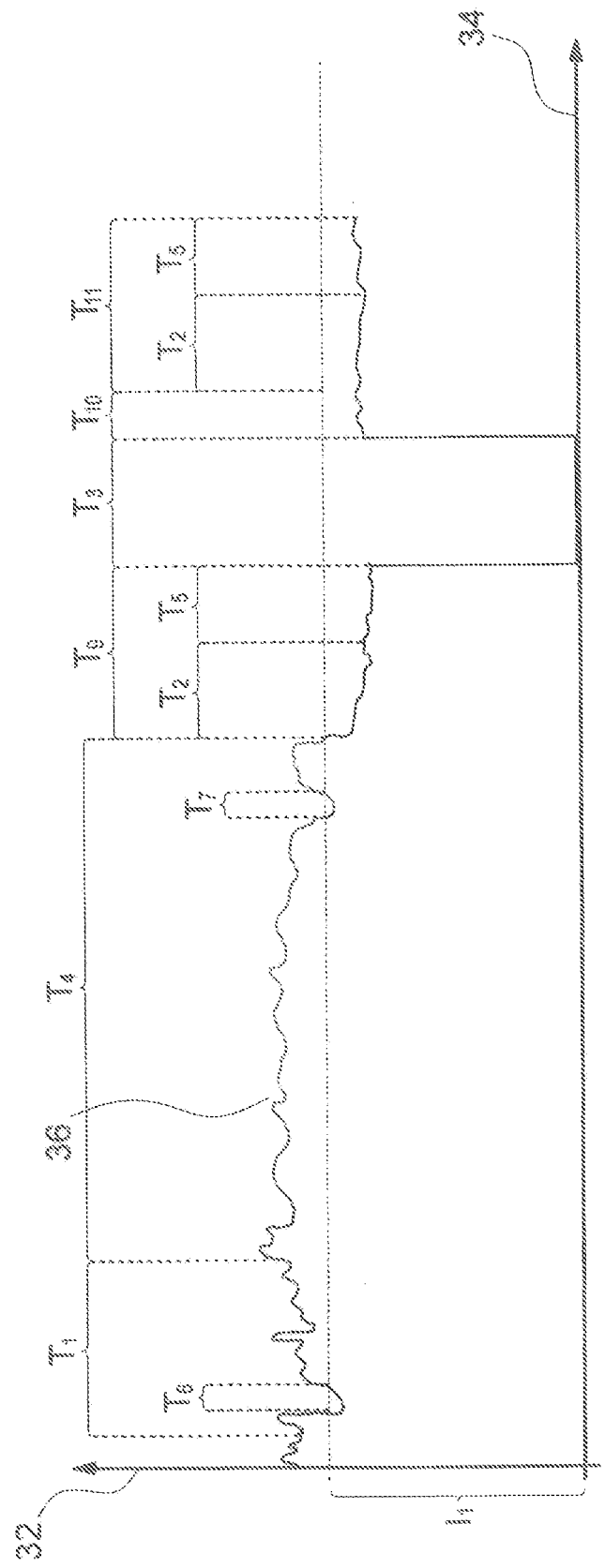

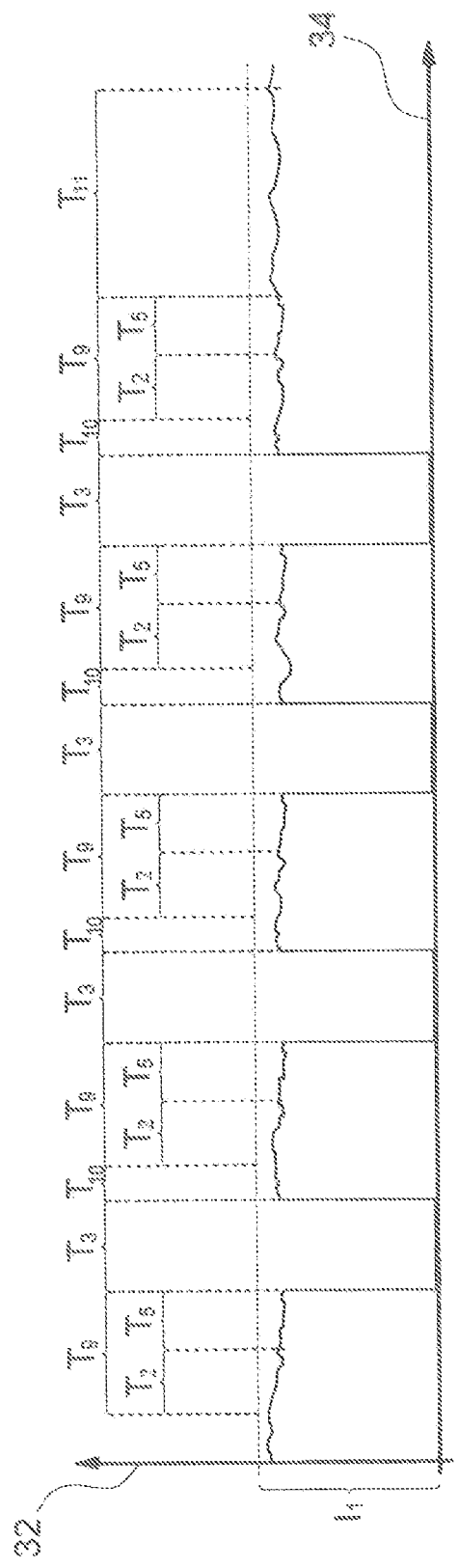

GRINDER UNIT AND METHOD FOR CONTROLLING IT

BACKGROUND OF THE INVENTION

The present invention generally relates generally to a grinder unit and a method for controlling it. The present invention more particularly relates to a grinder unit and a method for controlling a grinder unit that is provided with energy savings.

Effective solids conditioning is essential in order to achieve an efficient and reliable throughput in wastewater and sludge handlings systems. Therefore, various types of grinder units have been developed with the purpose of helping wastewater and sludge handling systems to operate more efficiently by reducing the particle size of solid waste material. The size reduction may be accomplished by a shearing, crushing, shredding action that is performed by one or more rotating elements of the grinder unit. Grinder units are typically used in wastewater and sludge handling systems. The grinder units play an important role because they reduce the particle size of solid waste material. In many applications this particle size reduction is required in order be able to use pumps for pumping wastewater and/or sludge.

Today, grinder units are normally built with counter rotating dual shaft design. A series of hardened cutters (like described in U.S. Pat. No. 5,511,729) are mounted on the dual rotating shafts. These cutters are configured to grind and hereby reduced the size of the solids.

Grinder units can be arranged in different configurations and normally they can be channel mount, wet-well, or as in-line pipe mounted. Traditionally an electrical panel is provided together with grinder unit. Inside the electrical panel there is the required emergency stop, breakers, fuses, etc. to form a safe electrical operation. Most electrical panels do also contain a Man-Machine interface with On/Off switch handle, audible and visual alarm indication in case of blockage, and display providing information on operational status of the grinder unit.

In order to reduce downtime of the grinder installation, some panels have a Programmable Logic Control (PLC) able to perform simple operation in case of blockage. Frequently, a current sensing device is continuously measuring the current of the grinder motor. When a blockage occurs, the current to the grinder motor will increase beyond a present level and the motor will be stopped. The PLC will then reverse the rotational direction of the grinder motor and the blocking device will be pushed back out from the cutting devices. When the reverse operation have been carried out for a short period the rotational sequence is shifted back to normal and grinding is continued. In case of running into overload situation (blockage) several times after each other—indicating that the grinder unit is not able to work its way through the solids—the operation will be stopped and normally an alarm will be given. But in many cases operational downtime is reduced as the grinder unit is able to overcome most solids, reversing a few times while cutting larger solids.

In most installation, the grinder units run continuously day and night, week after week, no matter whether solids are passing through the grinder or not. This leads to unnecessary high energy consumption.

BRIEF SUMMARY OF THE INVENTION

Accordingly, it is an objective of a preferred embodiment of the present invention to provide a grinder and a method for controlling a grinder unit that spends less energy than the known grinder units.

The method for controlling a grinder unit having current sensing means for measuring the current used by the grinder motor and a control device for controlling the activity of the grinder motor according to a preferred embodiment of the present invention is adapted to change the activity of the grinder motor on the basis of the measured current of the grinder motor. Since the control device is configured to change the activity of the grinder motor on the basis of the measured current of the grinder motor the grinder unit according to the invention is only activated when necessary and hereby the grinder unit according to a preferred embodiment of the present invention will be less energy consuming than the prior art grinder units. Thus, a preferred embodiment of the present invention discloses a way of reducing the energy spent by grinder units and makes it possible to extend the life time of the grinder unit.

The objective of a preferred embodiment of the present invention can be achieved by a method as disclosed herein.

Other objectives and further scope of applicability of a preferred embodiment of the present invention will become apparent from the description and the drawings given hereinafter. It should be understood, however, that the detailed description and specific examples, while indicating preferred embodiments of the present invention, are given by way of illustration only, since various changes and modifications within the spirit and scope of the invention will become apparent to those skilled in the art from this detailed description.

In one aspect of a preferred embodiment of the present invention, the grinder motor is stopped when the measured current of the grinder motor is below a predefined value for more than a predefined time period during a first time period where the grinder motor is activated. Hereby, it is achieved that the grinder motor is turned off when there is no need for the grinder motors grinding activity. Thus, energy can be saved compared with traditional grinder units. Moreover, the live time or the grinder unit may be extended due to the reduced activity time.

In another aspect of a preferred embodiment of the present invention, the methods for controlling the grinder unit include:
  a) the grinder motor is activated in a first time period;
  b) the current sensing means is measuring the current used by the grinder motor during at least a part of the first time period;
  c) it is determined whether the motor current is below a predefined value for more than a predefined time period during the first time period;
  d) if the motor current is below a predefined value for more than a predefined time period during the first time period, the grinder motor is stopped for a stopping period;
  e) if the motor current is above or equal to the predefined value for more than the predefined time period during the first time period, the grinder motor will continue to be activated for a time period.

Hereby it is achieved that the grinder motor is stopped when the motor current is below a predefined value for more than a predefined time period. In this way it is possible to control the grinder unit without any additional sensor. In fact, it would be possible to make a prior art grinder unit less energy consuming by using this control algorithm.

The current sensing means may measure the current used by the grinder motor constantly or alternatively during any part of the first time period. In a preferred embodiment of the present invention, the current sensing means may measure the current used by the grinder motor constantly. In other words, in a preferred embodiment of the present invention the current is being measured continuously. If the motor is on there is a current signal, however; if the motor off the current signal is zero.

In a further aspect of a preferred embodiment of the present invention, the method for controlling the grinder unit includes:
a) the grinder motor is activated in a first time period;
b) the current sensing means is measuring the current used by the grinder motor during at least a part of the first time period;
c) it is determined if the motor current is below a predefined value for more than a predefined time period during the first time period;
d) if the motor current is below or equal to a predefined value for more than a predefined time period then the grinder motor is stopped for a stopping period and the rotational direction of the grinder motor is reversed for a time period, before starting the operating in the normal direction;
e) if the motor current is above or equal to the predefined value for more than the predefined time period during the first time period, the grinder motor will continue to be activated for a time period.

This control algorithm secures that the grinder motor is reversed when the grinder motor has been deactivated. This is a major advantage, because huge amount of solid waste material in the fluid that is handled by the grinder unit otherwise would block the fluid passage at least for a period of time.

In another aspect of a preferred embodiment of the present invention, the method for controlling the grinder unit includes the following steps:
a) the grinder motor is activated in a first time period;
b) the current sensing means is measuring the current used by the grinder motor during at least a part of the first time period;
c) it is determined if the motor current is below a predefined value for more than a predefined time period during the first time period;
d) if the motor current is below or equal to a predefined value for more than a predefined time period then the grinder motor is stopped for a stopping period and the rotational direction of the grinder motor is reversed for a time period;
e) if the motor current is above or equal to the predefined value for more than the predefined time period during the first time period, the grinder motor will continue to be activated for a time period;
f) if the control device has decided to stop the grinder motor for a predefined number of successive time periods the duration of the stopping period is increased.

This control algorithm secures that the control of the grinder motor adapts to the actual activity need for the grinder motor. Hereby, the grinder motor activity will be further reduced in situations in which less activity is needed. Such grinder unit will be self-adapting.

It would be an advantage to have a grinder unit that includes a control device that is configured to be set into three modes.

In one preferred embodiment of the present invention, the control device is configured to be set into an On-mode, an Off-mode and an Automatic mode, where the grinder motor is permanently on in the On-mode, where the grinder motor is permanently off in the Off-mode and where the grinder motor is activated according to the control algorithm described in the claims in the Automatic mode.

Hereby it is achieved that the grinder unit can be operated in an energy saving automatic mode. Compared with the prior art grinder units, such a preferred embodiment offers an energy and money saving operation mode.

It is advantage it the grinder unit has a control device that comprises a micro processor and storage means. A micro processor and storage means would be an efficient way of carrying out the invention. It would be possible to program the control device or to change parameter values in order to achieve a demand specific control algorithm.

In one preferred embodiment of the present invention, the grinder unit includes an interface that is adapted to receive information either by typing directly by typing means or by using wireless communication means. Hereby, it is achieved that the algorithm of the control can be adjusted by the user of the grinder unit. Thus, it would be possible to change setting in order to meet specific requirements. The typing means may be a keyboard or display by way of example and the wireless communication means may be a mobile phone a remote control for instance.

In one preferred embodiment of the present invention, the grinder unit comprises at least one sensor configured to provide information about the solid waste material in the fluid that is handled by the grinder unit. Hereby, it is achieved that the control of grinder motor can be controlled on the basis of sensor signals. This information may be used as additional information that can be used to make the grinder unit and the method for controlling it even more efficient. The sensor may be any suitable sensor type. The sensor may be any available suitable sensor and the information from the sensor may be used in combination with the current measurement. By way of example if the measured current is high and the sensor signal is low it indicates that the grinder unit is blocked. On the other hand, if the measured current is low and the sensor signal is high, it indicates that the grinder unit should be activated in the near future. Therefore, the grinder unit should not be stopped even though the measured current is low. Accordingly, a combination of current measurements and additional sensor signals may be beneficial.

BRIEF DESCRIPTION OF THE SEVERAL VIEWS OF THE DRAWINGS

The foregoing summary, as well as the following detailed description of the present invention, will be better understood when read in conjunction with the appended drawings. For the purpose of illustrating the present invention, there are shown in the drawings embodiments which are presently preferred. It should be understood, however, that the present invention is not limited to the precise arrangements and instrumentalities shown.

The present invention will become more fully understood from the detailed description given herein below and the accompanying drawings which are given by way of illustration only, and thus, are not limitative of the present invention, and wherein in the drawings:

FIG. 3 shows a graph depicting a grinder motor current as function of time in accordance with a preferred embodiment of the present invention; and FIG. 4 illustrates another graph showing the grinder motor current as function of time in accordance with a preferred embodiment of the present invention.

DETAILED DESCRIPTION OF THE INVENTION

Figure 1:
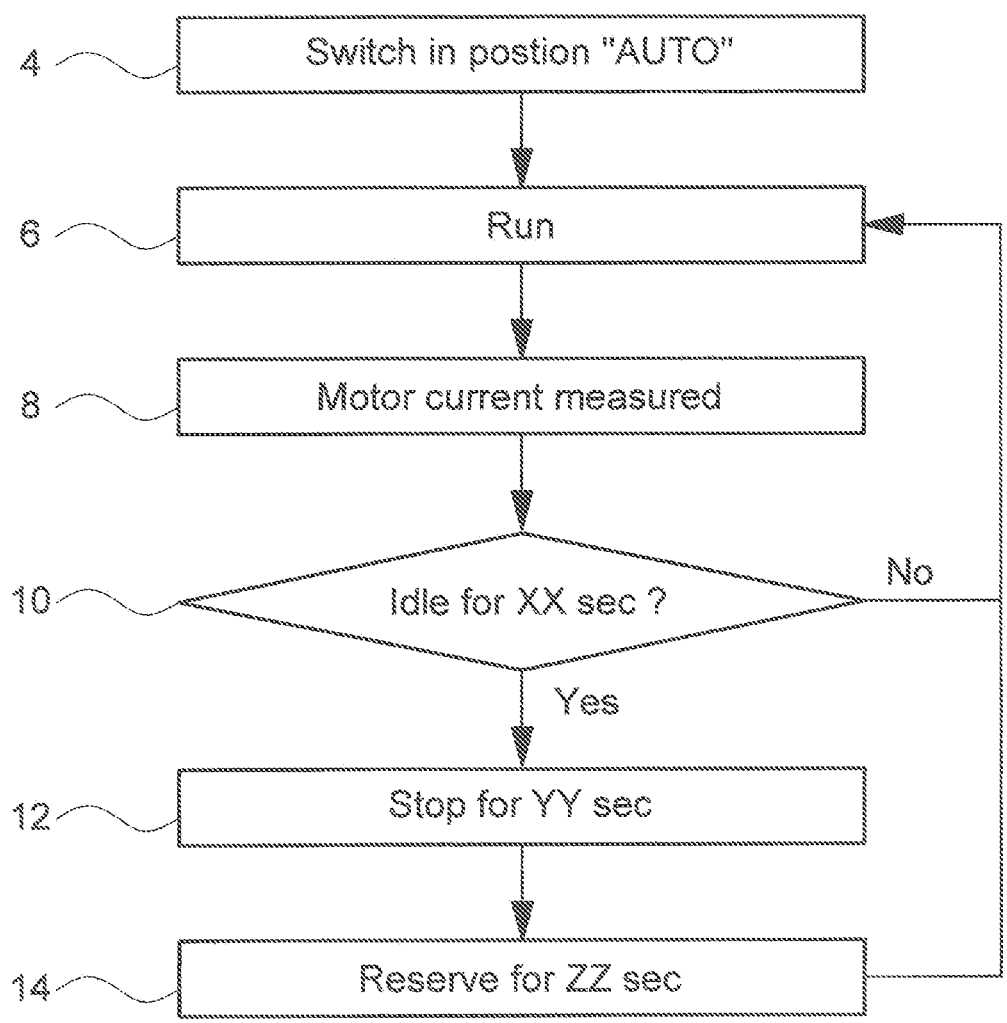
FIG. 1 shows a flow chart illustrating the basic principles of a method for controlling a grinder unit in accordance with a preferred embodiment of the present invention.

Certain terminology is used in the following description for convenience only and is not limiting. The words "bottom," "upper," "top" and "front" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Other objects and further scope of applicability of the present invention will become apparent from the detailed description given hereinafter. It should be understood, however, that the detailed description and specific examples, while indicating preferred embodiments of the present invention, are given by way of illustration only, since various changes and modifications within the spirit and scope of the invention will become apparent to those skilled in the art from this detailed description.

Referring now in detail to the drawings for the purpose of illustrating preferred embodiments of the present invention, a schematically diagram of the control algorithm according to grinder unit of a preferred embodiment of the present invention is illustrated in FIG. 1. The upper diagram box 4 indicates the actual mode that the grinder motor 20 has been set to. Thus, the box 4 is referred to as the mode box 4. In the example illustrated in FIG. 1, the mode has been set to "Automatic mode" indicated as "AUTO". In practice, it would be possible to switch a grinder motor 20 to an "On-mode" where the grinder motor 20 is turned on or and an "Off-mode" where the grinder motor 20 is turned off. The mode may be set by using a handle, a knob or other suitable means.

The second diagram box 6 from the top in FIG. 1 symbolises that the grinder motor 20 is running. When the mode is set to "Automatic mode" the grinder motor 20 will be activated and thus the grinder motor 20 will be running. The third box 8 from the top in FIG. 1 indicates that a motor current 32 of the grinder motor 20 is being measured. In a preferred embodiment according to the present invention, the current 32 of the grinder motor 20 is being measured continuously. However, it would also be possible to measure the motor current 32 in intervals such as every third second by way of example. It would also be possible to measure the current in short time periods such as 100 milliseconds interrupted by break periods.

In a preferred embodiment of the present invention, the motor current 32 is being monitored several times for each second. This would be beneficial in order to protect the shaft, the knives, the coupling in case of a blockage.

The third box 10 from the bottom in FIG. 1 illustrates a valuation mode in which a control device 16 checks whether the motor current 32 of the grinder motor 20 is below a predefined value $I_2$ for more than a predefined time period $T_2$ (indicated as "XX sec").

The second box 12 from the bottom in FIG. 1 illustrates what happens if the motor current 32 is below the predefined value $I_2$ for more than a predefined time period $T_2$. If the motor current 32 is below the predefined value $I_2$ for more than a predefined time period $T_2$ the grinder motor 20 is stopped for a predefined stopping period $T_3$ (indicated as "YY sec"). After this stopping period $T_3$ the rotational direction of the grinder motor 20 may be reversed in order to avoid blockage of the grinder motor 20 due to solids that have accumulated in front of the grinder cutters 26.

The activation of the grinder motor 20 in reverse direction is symbolised by the box 14 at the bottom. The reversed activation of the grinder motor 20 is maintained for a period $T_{10}$ (indicated as "ZZ sec").

If the motor current 32 is above the predefined value $I_2$ for more than a predefined time period $T_2$ the control device 16 will maintain the activity of the grinder motor 20.

In a preferred embodiment according to the present invention, it is possible to change the time periods $T_1$, $T_2$ and $T_3$. The time periods $T_1$, $T_2$ and $T_3$ may be changed by using the control device 16. Setting of the time periods $T_1$, $T_2$ and $T_3$ may be accomplished by typing directly into an interface (not shown).

Figure 2:
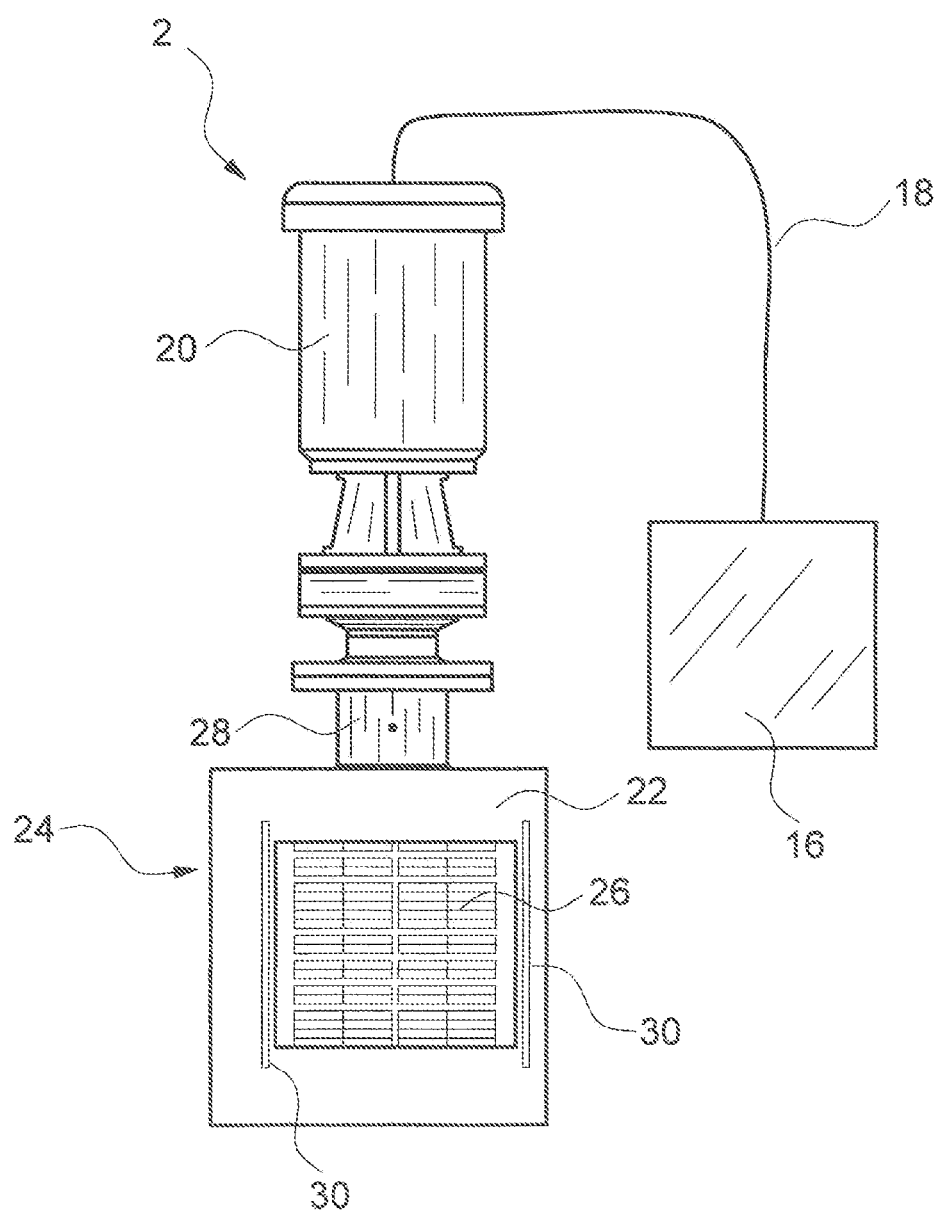
FIG. 2 is a front elevational view of a grinder unit in accordance with a preferred embodiment of the present invention.

FIG. 2 illustrates a grinder unit 2 according to a preferred embodiment of the present invention. The grinder unit 2 preferably includes a grinder box 24, an electric motor 20 being controlled by a control box 16 that is connected to the motor 20 by a wire 18. The grinder box 24 preferably includes two sets of grinder cutters 26 that are configured to reduce the particle size of the solid waste material that is present in the fluid that is handled. The size reduction is accomplished by a shearing, crushing, shredding action performed by the rotating grinder cutters 26 of the grinder unit 2. The grinder box 24 moreover comprises a gear 22 that is provided in order to alter the rotational speed of the grinder cutters 26 relative to the rotational speed of the grinder motor 20. The gear 22 may reduce the rotational speed of the grinder cutters 26 relative to the rotational speed of the grinder motor 20. The grinder motor 20 is connected to the gear box 22 through a coupling 28.

The grinder box 24 is also provided with two sensors 30. Theses sensors 30 are adapted to provide information about the solid waste material in the fluid that is handled. The sensors 30 may detect whether solid waste material is present in front of the grinder cutters 26. The sensors 30 may be any suitable type of sensors. The grinder unit 2 preferably includes means for detecting the current 32 of the grinder motor 20. In a preferred embodiment of the present invention, the means for detecting the current 32 of the grinder motor 20 is arranged in the control box 16.

In one preferred embodiment of the present invention, the sensors are configured to detect the presence of solid waste material on the basis of visual measurements and/or pressure measurements. However, any other suitable sensor means may be used. The sensors 30 may be a part of the grinder box 24, however; in one preferred embodiment of the present invention, sensors 30 may be arranged separately somewhere else (e.g. 20 cm in front of the grinder cutters 26). It would be possible to have a grinder unit 2 without sensors 30.

FIG. 3 illustrates a graph 36 depicting the current 32 of the grinder motor 20 as function of time 34. It can be seen from the graph 36 that the current 32 varies as function of time 34. The current 32 of the grinder motor 20 reflects the activity of the grinder motor 20. On the other hand, the current in the grinder motor 20 will not be zero even in the periods where no solid waste material enters the grinder cutters 26. In these periods there will the grinder motor 20 will still be loaded and thus a certain level, $I_1$, of current 32 will be detected in the grinder motor 20. In FIG. 4, this level $I_1$ of current 32 is indicated with a dotted line. $I_1$ is indicated at the current 32 axis of FIG. 4. It can be seen that the current 32 is below $I_1$ in two short low load time periods $T_6$ and $T_7$. These periods have relative short duration. In fact, the duration of both $T_6$ and $T_7$ is below a preset duration value $T_2$ that is used to detect whether the grinder motor 20 is active or not. In FIG. 4, the motor current 32 is initially measured in a first time period $T_1$. During this first time period $T_1$ the current 32 of the grinder motor 20 exceeds the predefined current level $I_1$ most of the time, however; the current 32 of the grinder motor 20 is below the predefined current level $I_1$ in the time period $T_6$. The time period $T_6$ is however shorter than the time period $T_2$ that is used to decide whether or not the grinder motor 20 should be stopped in a stopping period $T_3$. Since the time period $T_6$ is shorter than the time period $T_2$ the algorithm in the control device 16 decides that the grinder motor 20 should continue to be activated for a time period $T_4$. For illustrative purpose, it is shown that the current 32 of the grinder motor 20 is below the predefined current level $I_1$ in the time period $T_7$. No current measurements are used to change the activity of the grinder motor 20 during the time period $T_4$. Thus, a low current 32 of the grinder motor 20 during a time period such as $T_7$ would not have any impact on the control of the grinder motor 20 even if the duration of the time period with low current 32 was longer than $T_2$.

In a preferred embodiment of the present invention, the current 32 of the grinder motor 20 is measured continuously, however; it would also be possible not to measure the current 32 of the grinder motor 20 in the time period $T_4$ since the grinder motor 20 is activated.

The time period $T_4$ of activation is followed by a measurement time period $T_9$ where the current 32 of the grinder motor 20 is detected for the purpose of making a decision about the following activity of the grinder motor 20. In the measurement time period $T_9$ the current 32 of the grinder motor 20 is below the predefined current level $I_1$ for a longer time period than the time period $T_2$ (in fact the current 32 of the grinder motor 20 is below the predefined current level $I_1$ in the total time period $T_9$). Therefore, the algorithm in the control device 16 decides that the grinder motor 20 should stop for a stopping period $T_3$ and hereafter the rotational direction of the grinder motor 20 is reversed for a time period $T_{10}$. After the time period $T_{10}$ the current 32 of the grinder motor 20 is measured in a time period $T_{11}$. In this time period $T_{11}$ the current 32 of the grinder motor 20 is below the predefined current level $I_1$ for a longer time period than the time period $T_2$. Accordingly, the algorithm in the control device 16 decides that the grinder motor 20 should stop for a time period and the rotational direction of the grinder motor 20 is reversed for a time period. In FIG. 4 the time periods $T_1$, $T_9$ and $T_{11}$ have equal duration.

The durations of the time periods $T_1$, $T_2$, $T_3$, $T_9$, $T_{10}$ and $T_{11}$ may be changed by the user of the grinder unit 2. It is also possible to use an algorithm that is configured to adapt to the activation pattern that is actual. In one preferred embodiment of the present invention, the control device 16 is configured to increase the duration of the time period that the grinder motor 20 is being stopped following a low measurement of current 32. In one preferred embodiment of the present invention, the control device 16 is configured to increase the duration of the time period when the control device 16 has decided to stop the grinder motor 20 for four successive times following a low measurement of current 32.

This is illustrated in FIG. 4. In FIG. 4 the current 32 of the grinder motor 20 is generally low. In fact the current 32 of the grinder motor 20 is below the predefined current level $I_1$ at all time periods illustrated in FIG. 4. Initially the current 32 of the grinder motor 20 is measured in a time period $T_9$. In this time period $T_9$ the current 32 of the grinder motor 20 is below the predefined current level $I_1$ for a longer period than the time period $T_2$. Therefore, the grinder motor 20 is stopped in a stopping period $T_3$. Hereafter the current 32 of the grinder motor 20 is measured in a time period $T_9$ and in this time period $T_9$ the current 32 of the grinder motor 20 is below the predefined current level $I_1$ for a longer period than the time period $T_2$. Thus, the grinder motor 20 is stopped in a stopping period $T_3$. This procedure is carried out four times and hereafter the control device 16 adapts to the "low activity situation" by increasing the period $T_{11}$ in which the grinder motor 20 is stopped. The time period $T_{11}$ may be twice as long as the stopping period $T_3$ by way of example.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for controlling a grinder unit (2) having current sensing means for measuring current (32) used by a grinder motor (20) and a control device (16) for controlling the activity of the grinder motor (20), wherein activity of the grinder motor (20) is changed on a basis of the measured current (32) of the grinder motor (20), the method comprising:
   a) activating the grinder motor (20) for a first time period ($T_1$);
   b) measuring the current (32) used by the grinder motor 20 during at least a part of the first time period ($T_1$, $T_9$, $T_{11}$);
   c) determining whether the motor current (32) is below a predefined value ($I_1$) for more than a predefined time period ($T_2$) during the first time period ($T_1$, $T_9$, $T_{11}$);
   d) stopping the grinder motor (20) for a stopping period ($T_3$) if the motor current (32) is below a predefined value ($I_1$) for more than a predefined time period ($T_2$);
   e) continuing to activate the grinder motor (20) for a time period ($T_4$) if the motor current (32) is above or equal to the predefined value ($I_1$) for more than the predefined time period ($T_2$) during the first time period ($T_1$, $T_9$, $T_{11}$); and
   f) increasing a duration of the stopping period ($T_3$) if the control device (16) has stopped the grinder motor (20) for a predefined number of successive time periods.

2. The method according to claim 1, the method further comprising:
   stopping the grinder motor (20) when the measured current (32) of the grinder motor (20) is below the predefined value ($I_1$) for more than the predefined time period ($T_2$) during the first time period ($T_1$) where the grinder motor (20) is activated.

3. The method according to claim 1, wherein the stopping step further comprises stopping the grinder motor (20) for a stopping period ($T_3$) if the motor current (32) is below the predefined value ($I_1$) for more than the predefined time period ($T_2$) during the first time period ($T_1$, $T_9$, $T_{11}$), and reversing a rotational direction of the grinder motor (2) for a time period ($T_{10}$).

4. The method according to claim 1, wherein the stopping step further comprises reversing a rotational direction of the grinder motor (20) for a time period ($T_{10}$), before starting an operation in the normal direction.

5. The method according to claim 1, further comprising:
   providing information about solid waste material in a fluid that is handled by the grinder unit (2) from at least one sensor (30); and
   using the information to control the grinder unit (2).

6. A grinder unit (2) comprising:
   an electrical grinder motor (20), current sensing means for measuring the current (32) used by the grinder motor (20) during at least a part of a first time period ($T_1, T_9, T_{11}$), and a control device (16) configured to:
- determine whether the motor current (32) is below a predefined value ($I_1$) for more than a predefined time period ($T_2$) during the first time period ($T_1, T_9, T_{11}$);
- stop the grinder motor (20) for a stopping period ($T_3$) if the motor current (32) is below a predefined value ($I_1$) for more than a predefined time period ($T_2$);
- continue to activate the grinder motor (20) for a time period ($T_4$) if the motor current (32) is above or equal to the predefined value ($I_1$) for more than the predefined time period ($T_2$) during the first time period ($T_1, T_9, T_{11}$); and
- increase a duration of the stopping period ($T_3$) if the control device (16) has stopped the grinder motor (20) for a predefined number of successive time periods, thereby controlling the activity of the grinder motor (20).

7. The grinder unit (2) according to claim 6, wherein the control device (16) is configured to be set into three modes.

8. The grinder unit (2) according to claim 7, wherein the control device (16) is configured to be set into an On-mode, an Off-mode and an automatic mode, wherein the grinder motor (20) is turned on in the On-mode, wherein the grinder motor (20) is turned off in the Off-mode, and wherein the grinder motor (20) is activated according to a control algorithm in the automatic mode.

9. The grinder unit (2) according to claim 6, wherein the control device (16) comprises a micro processor and storage means.

10. The grinder unit (2) according to claim 6, wherein the grinder unit (2) further comprises an interface that is adapted to receive information either by typing directly by typing means or by using wireless communication.

11. The grinder unit (2) according to claim 6, wherein the grinder unit (2) further comprises at least one sensor (30) configured to provide information about the solid waste material in the fluid that is handled by the grinder unit (2).

* * * * *